United States Patent
Murofushi

(10) Patent No.: US 8,830,703 B2
(45) Date of Patent: Sep. 9, 2014

(54) POWER SUPPLY APPARATUS HAVING PLURAL CONVERTERS AND A ZERO CROSSING SIGNAL OUTPUT UNIT

(75) Inventor: Mitsuhide Murofushi, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/690,485

(22) Filed: Jan. 20, 2010

(65) Prior Publication Data

US 2010/0195352 A1 Aug. 5, 2010

(30) Foreign Application Priority Data

Jan. 30, 2009 (JP) ................................. 2009-020738

(51) Int. Cl.
*H02M 3/335* (2006.01)
*G05F 1/00* (2006.01)

(52) U.S. Cl.
USPC ........................................ 363/21.16; 323/272

(58) Field of Classification Search
USPC ......... 363/21.01, 21.12, 21.15–21.18, 65, 67, 363/69, 71
See application file for complete search history.

(56) References Cited

U.S. PATENT DOCUMENTS

| | | | | |
|---|---|---|---|---|
| 5,309,344 A | * | 5/1994 | Smith | 363/20 |
| 5,745,358 A | * | 4/1998 | Faulk | 363/95 |
| 7,035,122 B2 | * | 4/2006 | Kim et al. | 363/21.18 |
| 7,499,295 B2 | * | 3/2009 | Indika de Silva et al. | 363/21.18 |
| 2007/0274112 A1 | * | 11/2007 | Lalithambika et al. | 363/74 |

FOREIGN PATENT DOCUMENTS

| | | | |
|---|---|---|---|
| JP | 2003-199336 | | 7/2003 |
| JP | 2008-172914 | | 7/2008 |
| JP | 2008-172914 A | | 7/2008 |
| JP | 2008172914 A | * | 7/2008 |

* cited by examiner

*Primary Examiner* — Jue Zhang
*Assistant Examiner* — Henry Lee, III
(74) *Attorney, Agent, or Firm* — Fitzpatrick, Cella, Harper & Scinto

(57) ABSTRACT

The power supply apparatus includes a first control part that controls a switching operation of a first converter, a second control part that controls a switching operation of a second converter, a zero crossing circuit that outputs a zero crossing signal of a voltage to be input; and a voltage supply part that supplies a DC voltage obtained by rectifying an output of an auxiliary coil of a transformer of the first converter to the first control part, the second control part, and the zero crossing circuit. When the first converter stops, the supply of the DC voltage to the second control part and the zero crossing circuit is stopped to reduce a power consumption.

10 Claims, 9 Drawing Sheets

POWER SUPPLY APPARATUS HAVING PLURAL CONVERTERS AND A ZERO CROSSING SIGNAL OUTPUT UNIT

BACKGROUND OF THE INVENTION

1. Field of the Invention

The present invention relates to a power supply apparatus that insulates a primary side from a secondary side by a transformer, and transmits an electric power to the secondary side by switching operation at the primary side, and to a method of controlling the power supply apparatus. For example, the present invention relates to a power supply apparatus that receives AC 100 V from an outlet with a commercial power as a supply source, performs rectification and smoothing at the primary side to convert the AC voltage into a DC voltage, and transmits an electric power to the secondary side through a switching transformer by the switching operation at the primary side.

2. Description of the Related Art

The power supply apparatus converts an AC voltage from an AC line into a DC voltage as an AC/DC converter, and applies the DC voltage to another device or a unit connected thereto. A switching system has been widely used in the AC/DC converter that converts an AC input voltage into a DC output voltage. In the power supply apparatus, there may be used a switching transformer in which an input and an output are configured in combination with a core material so as to magnetically couple a primary coil with a secondary coil. The coils are used in the switching transformer as described above, and an electrically conductive material such as a copper wire is coated with an insulating film in use. Further, the primary coil and the secondary coil are insulated from each other.

Further, the power supply apparatus may include a zero crossing circuit that outputs a timing at which an AC voltage of an AC line crosses nearly 0 V together with an output of the DC voltage. For example, the zero crossing circuit is used for such a control as to start the energization of an AC load connected to the AC line with reference to a zero crossing signal. For example, an AC motor, a heater having a heating element, an AC/DC power supply connected thereto and so on can be considered as the AC load.

In the power supply apparatus having the above-mentioned zero crossing circuit, the conversion efficiency of AC into DC is improved by reducing the power consumption of the zero crossing circuit. For that reason, when a timing made by the zero crossing signal is required for controlling the load connected to the AC line, a power supply to the zero crossing circuit starts, whereas the power supply to the zero crossing circuit stops in a state where the timing made by the zero crossing signal is unnecessary. This leads to an improvement in the conversion efficiency.

Further, Japanese Patent Application Laid-Open No. 2003-199336 discloses a device having a relay that interrupts a power supply to the zero crossing circuit from the AC line in a low power consumption state such as a standby mode or a sleep mode from the normal operation.

However, in Japanese Patent Application Laid-Open No. 2003-199336, there are required two control systems, that is, a control for interrupting the power supply to the zero crossing circuit by the relay in the low power consumption state such as the standby mode or the sleep mode, and a control of the switching operation. Accordingly, when the two systems are controlled at the same time, there arises a problem that the circuit scale becomes large, resulting in the useless control configuration.

Further, when said plural converters are connected to provide plural transformers as an auxiliary power supply, an electric power is consumed every time an output from an auxiliary coil of each transformer is smoothed. As a result, there arises a problem that the electric power is consumed by the plural transformers.

SUMMARY OF THE INVENTION

The present invention has been made in view of the above-mentioned problems. An object of the present invention is to provide a power supply apparatus that is capable of reducing the number of auxiliary coils of the plurality of converters to reduce a power consumption in rectifying an output from each auxiliary coil, to thereby reduce the power consumption of a zero crossing circuit.

Another object of the present invention is to provide a power supply apparatus including a plurality of converters, a first control part that controls a switching operation of a first converter among the converters, a second control part that controls a switching operation of a second converter among the plurality of converters, a zero crossing circuit that outputs a zero crossing signal at a zero crossing timing of a voltage to be input to the plurality of converters, a voltage supply part that supplies a DC voltage obtained by rectifying an output of an auxiliary coil of a transformer of the first converter to the first control part, the second control part, and the zero crossing circuit, and a switch part that changes over the supply of the DC voltage to the second control part and the zero crossing circuit, in which, when the first converter stops, the switch part stops the supply of the DC voltage to the second control part and the zero crossing circuit.

Further features of the present invention will become apparent from the following description of exemplary embodiments with reference to the attached drawings.

DESCRIPTION OF THE EMBODIMENTS

Hereinafter, the configuration and operation of the present invention are described. Specific embodiments are described after the basic configuration and operation have been described. The following embodiments are exemplary, but the technical scope of the present invention is not limited to only those embodiments.

Hereinafter, the embodiments of the present invention are described in detail with reference to the accompanying drawings.

(Applied Example of a Power Supply Apparatus According to this Embodiment)

Figure 1:
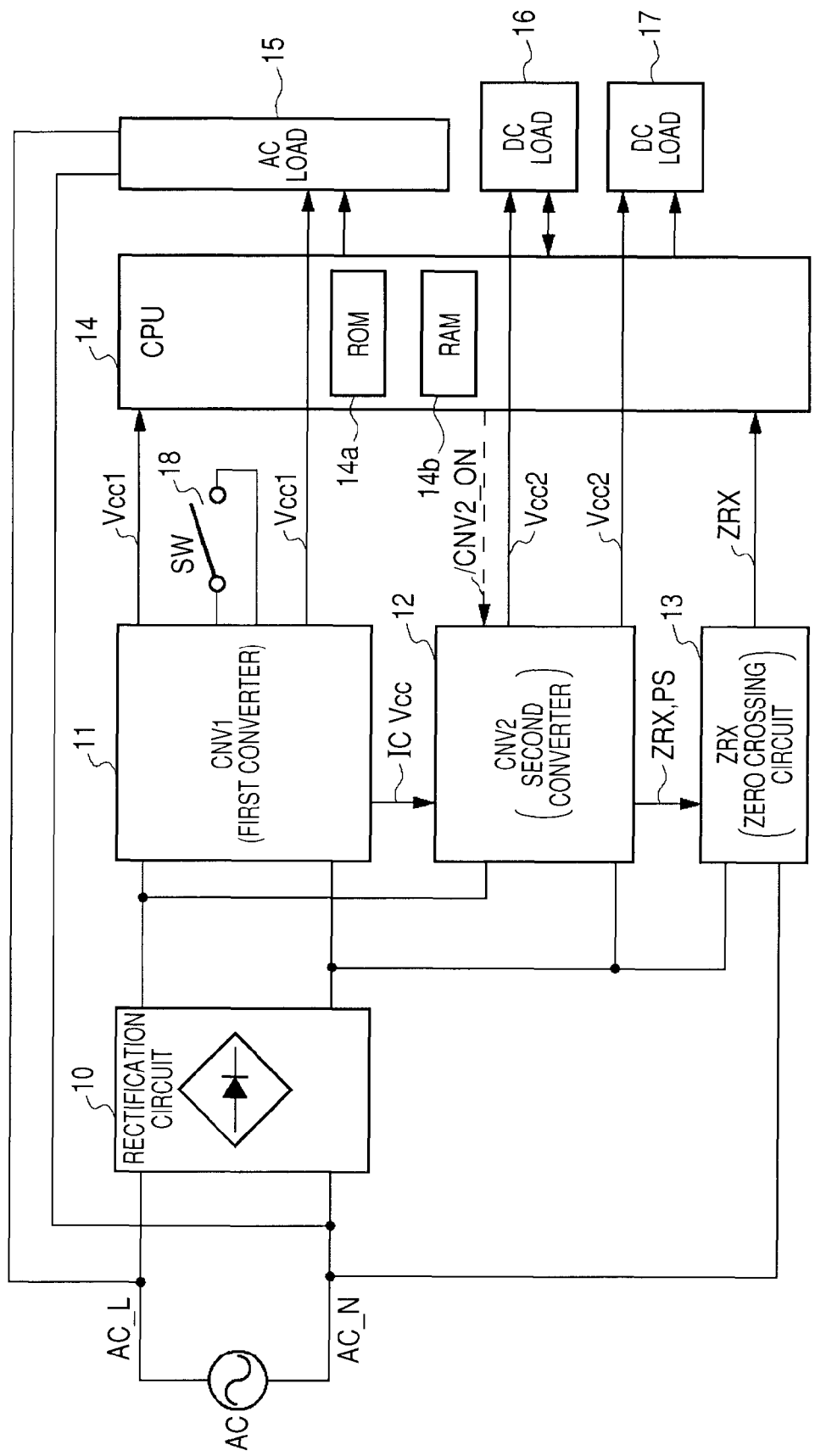
FIG. 1 is a block diagram illustrating an example of a system including a power supply apparatus according to an embodiment.

FIG. 1 is a block diagram illustrating a configuration example of a power supply apparatus according to an embodiment of the present invention, and a configuration example of a load connected to the power supply apparatus.

The power supply apparatus includes a rectification circuit 10 that rectifies an input voltage from an alternating-current (AC) supply source such as a commercial power supply being an input power supply into a direct-current (DC) voltage. The rectification circuit 10 is connected to a first converter (CNV1) 11 and a second converter (CNV2) 12. The first converter (CNV1) 11 steps down the above-mentioned rectified DC voltage through a switching system to generate a voltage Vcc1. The second converter (CNV2) 12 steps down the rectified DC voltage through the switching system to generate a voltage Vcc2. The power supply apparatus includes a zero crossing circuit (ZRX) 13 that detects a zero crossing timing of the voltage from the AC supply source to output a ZRX signal. The CNV1 corresponds to a first control power supply unit, the CNV2 corresponds to a second control power supply unit, and the ZRX corresponds to a zero crossing signal power supply unit.

The power supply apparatus includes a central processing unit (CPU) 14. The central processing unit (CPU) 14 receives the ZRX signal from the above-mentioned zero crossing circuit 13, and conducts the operation timing setting and control of an AC load 15 to be controlled. Further, the central processing unit 14 also controls the operation of DC loads (DC circuits) 16 and 17 that operate upon application of the DC voltage. The CPU 14 has a read only memory (ROM) 14a incorporated therein in which the contents of the control by the CPU 14 are recorded. The CPU 14 executes arithmetic processing on the basis of the contents of the control. Further, the CPU 14 has a random access memory (RAM) 14b incorporated therein, which has a memory region used for temporarily holding data in the arithmetic processing of the CPU 14 and executing the arithmetic operation.

Loads that are connected to the power supply apparatus are, for example, the AC load 15, the DC load 16, and the DC load 17. The AC load 15 is connected to electric power lines AC_L and AC_N from the AC supply source, and controlled by the CPU 14. The energization of the AC load 15 is controlled in energization timing on the basis of the ZRX signal from the zero crossing circuit 13 in order to reduce an inrush current by reducing a change in the current due to energization at a time point when the AC voltage is 0 V. The DC loads (DC circuits) 16 and 17 are controlled by the CPU 14 with Vcc2 as the power source. For example, the DC loads (DC circuits) 16 and 17 are an output unit such as a DC motor, and an input unit such as a sensor operating with the DC power supply.

A switch (SW) 18 is so designed as to select whether to output the voltage Vcc1 from the first converter 11 or not by user's operation. An operation DC power is supplied to the second converter 12 from the first converter 11 as a voltage IC Vcc, and a zero crossing signal generation power ZRX_PS is supplied to the zero crossing circuit 13 from the second converter 12.

A signal /CNV2_ON indicated by a broken line arrow is a signal to be set to a high level during a power saving mode of the CPU 14 for stopping the second converter 12 and the zero crossing circuit 13, and used in second to fourth embodiments. Further, in the power saving mode, the operation of the AC load 15 is also stopped by the CPU 14.

For example, when the power supply apparatus according to this embodiment is applied to an image forming apparatus, a fixing apparatus is conceivable as the AC load 15, and power supply to a heater in the fixing apparatus is stopped in correspondence with the operation of triac according to an instruction from the CPU 14. Further, for example, a motor that transports a sheet, and a sensor that detects the sheet are conceivable as the DC loads (DC circuits) 16 and 17. The power supply apparatus according to this embodiment may be applied to an image forming apparatus such as a printer, a copying machine, or a facsimile machine, to thereby obtain remarkable advantages.

Hereinafter, a first embodiment of the present invention is described with reference to the accompanying drawings.

<Circuit Configuration Example of a Power Supply Apparatus in First Embodiment>

Figure 2:
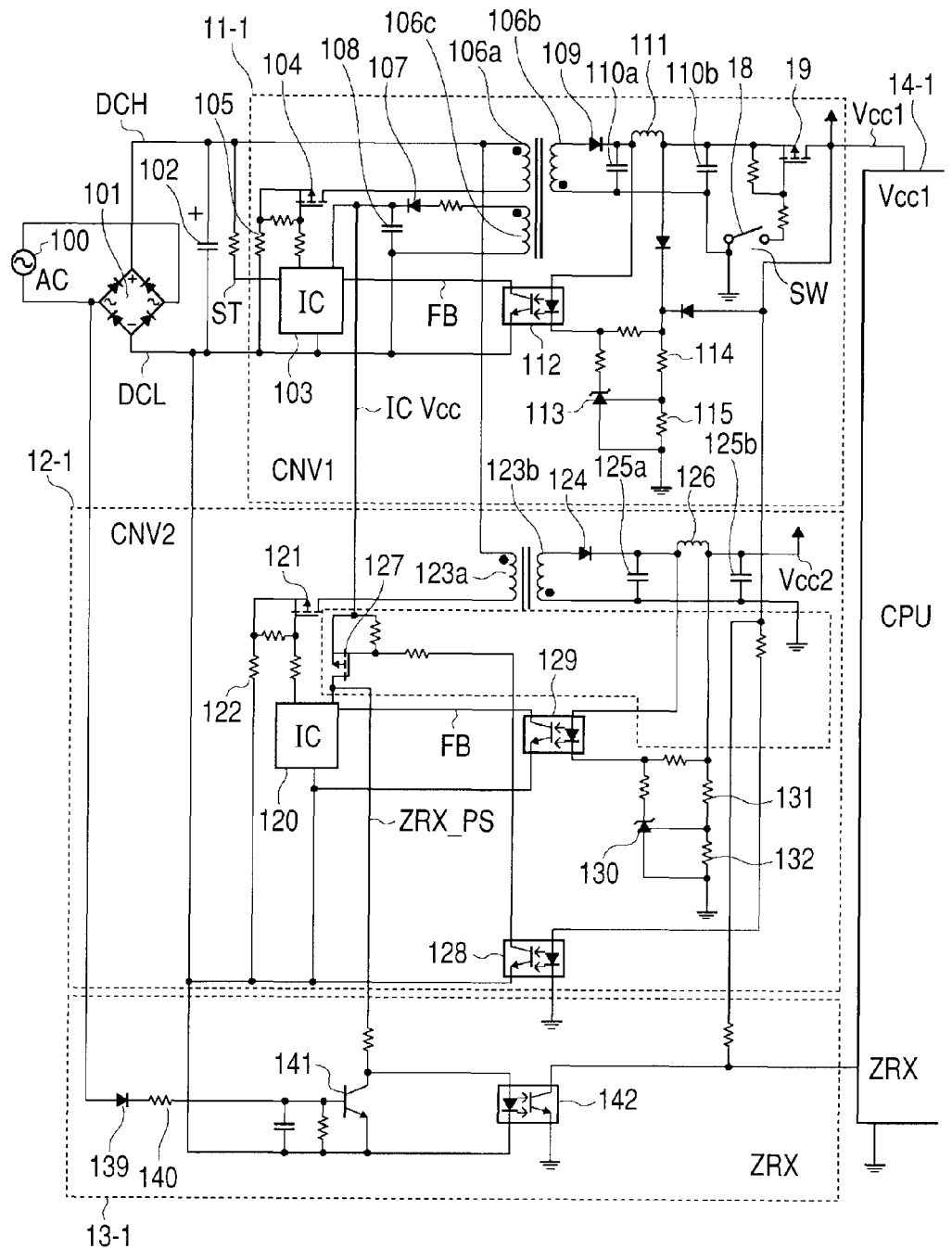
FIG. 2 is a diagram illustrating a circuit configuration example of a power supply apparatus according to a first embodiment.

FIG. 2 is a diagram illustrating the circuit configuration example of a power supply apparatus according to the first embodiment.

In FIG. 2, the power supply apparatus includes an AC supply source 100 such as a commercial power supply, and a bridge rectification circuit 101. A smoothing capacitor 102 is applied with a DC voltage that has been subjected to full wave rectification, and smoothes the voltage.

(First Converter 11-1)

A power supply IC 103 controls the switching operation of the first converter 11-1. In this embodiment, an example using the power supply IC is described. Alternatively, there may be used a method in which parts are combined together, individually. The power supply IC 103 performs the switching operation (on/off control) of a switching element 104. Further, the power supply IC 103 starts with a DC voltage connected to an ST terminal. In this embodiment, the switching element for the switching operation is exemplified by a MOSFET, but is not particularly limited thereto. The switching element 104 is connected with a current detection resistor 105. The current detection resistor 105 is used to detect a current in the switching element 104 during the switching operation, and to control a timing of switching by the power supply IC 103 as occasion demands.

The power supply apparatus includes switching transformers 106 (106a, 106b, 106c). The switching transformer 106a is a main coil at the primary side. A voltage between DCH and DCL after rectification is applied to the main coil at the primary side in pulses by the switching element 104. The switching transformer 106b is a Vcc1 output coil of a secondary side output. The switching transformer 106c is an auxiliary coil that supplies an operation power to the power supply IC 103. The power supply IC 103 performs the switching operation after starting from the above-mentioned ST terminal, and continues the operation by an output from the auxiliary coil 106c. A diode 107 is a diode that executes a half-wave rectification on the output from the auxiliary coil 106c, and a smoothing capacitor 108 is also provided. The smoothed voltage becomes IC Vcc, and is supplied to the power supply IC 103.

A diode 109 is a diode that rectifies an output from the coil 106b, and smoothing capacitors 110a and 110b are also provided. The smoothed voltage is output as Vcc1 by turning on an FET 19 in a state where the SW 18 disposed at the secondary side is on. In a state where the SW 18 is off, the FET 19 turns off to stop the output of Vcc1. A choke coil 111 reduces a current peak value to the smoothing capacitor 110b.

In this embodiment, a photo-coupler 112, a shunt regulator 113, and resistors 114 and 115 constitute a voltage feedback circuit for stabilizing the potential of Vcc1. Further, the photo-coupler 112 isolates the primary side from the secondary side for separation, and transmits a voltage output state of Vcc1 from the secondary side to an FB terminal of the power supply IC 103 disposed at the primary side depending on a light emitting state of a light emitting part. A method and configuration of the voltage feedback circuit of Vcc1 are not particularly restricted.

(Second Comparator 12-1)

A power supply IC 120 controls the switching operation of the second converter 12-1. The power supply IC 120 performs the switching control (on/off control) of a switching element 121. In this embodiment, the switching element is exemplified by an MOSFET, but is not particularly limited thereto. A current detection resistor 122 is connected to the switching element 121. The current detection resistor 122 is used to detect a current in the switching element 121 during the switching operation, and to control a timing of switching by the power supply IC 120 as occasion demands.

The power supply apparatus includes switching transformers 123 (123a, 123b). The switching transformer 123a is a main coil at the primary side. A voltage between DCH and DCL after rectification is applied to the main coil at the primary side in pulses by the switching element 121 controlled by the power supply IC 120. The switching transformer 123b is a Vcc2 output coil of a secondary side output.

A diode 124 is a diode that rectifies an output from the coil 123b, and smoothing capacitors 125a and 125b are also provided. The smoothed voltage is Vcc2. A choke coil 126 reduces a current peak value to the smoothing capacitor 125b.

A switching element 127 switches between applying and stopping the IC Vcc from the first converter 11-1 to the power supply IC 120 as the operation power. At the same time, the switching element 127 switches between applying and stopping the IC Vcc to the zero crossing circuit 13-1 as the zero crossing signal generation power ZRX_PS. In this embodiment, the switching element 127 uses an MOSFET, but the switching unit is not particularly restricted. A photo-coupler 128 isolates the primary side of the second converter 12-1 from the secondary side thereof for separation, and controls the switching element 127 by energization of the light emitting side.

A photo-coupler 129, a shunt regulator 130, and resistors 131 and 132 constitute a voltage feedback circuit for stabilizing the potential of Vcc2. Further, the photo-coupler 129 isolates the primary side of the circuit from the secondary side thereof for separation, and transmits a voltage output state of Vcc2 from the secondary side of the circuit to an FB terminal of the power supply IC 120 disposed at the primary side of the circuit depending on a light emitting state of a light emitting part. A method and configuration of the voltage feedback circuit of Vcc2 are not particularly restricted.

When Vcc1 is output in a state where the SW 18 is on, a light emitting side element of the photo-coupler 128 is energized, and the switching element 127 turns on. For that reason, IC Vcc from the first converter 11-1 is supplied to the power supply IC 120 as the operation power, and the power supply IC 120 operates to output Vcc2. At the same time, the zero crossing signal generation power ZRX_PS is supplied to the zero crossing circuit 13-1.

When the SW 18 is off, the output of Vcc1 stops, the energization of the light emitting side element of the photo-coupler 128 stops, and the switching element 127 turns off. For that reason, the supply of IC Vcc from the first converter 11-1 to the power supply IC 120 stops, the power supply IC 120 stops, and the output of Vcc2 stops. At the same time, the zero crossing signal generation power ZRX_PS to the zero crossing circuit 13-1 stops.

(Zero Crossing Circuit 13-1)

A diode 139 connected to the AC supply source generates a half wave of a line voltage of the AC supply source, and supplies a voltage of the half-wave input to a switching element 141 via the resistor 140 to generate an on/off state. When the switching element 141 is on, the light emitting side element of the photo-coupler 142 turns off, and the ZRX signal becomes high, and is output to the CPU 14. When the switching element 141 is off, the light emitting side element of the photo-coupler 142 turns on, and the ZRX signal becomes low, and is output to the CPU 14. The switching point is a timing at which the AC voltage from the AC supply source crosses 0 V, and the AC voltage is output to the CPU 14 as the zero crossing signal ZRX. The CPU 14 detects the switching point as the zero crossing timing, and controls the energization timing of the AC power to the AC load 15 described above with reference to FIG. 1.

<Operational Procedure Example of Power Supply Apparatus in First Embodiment>

Figure 3:
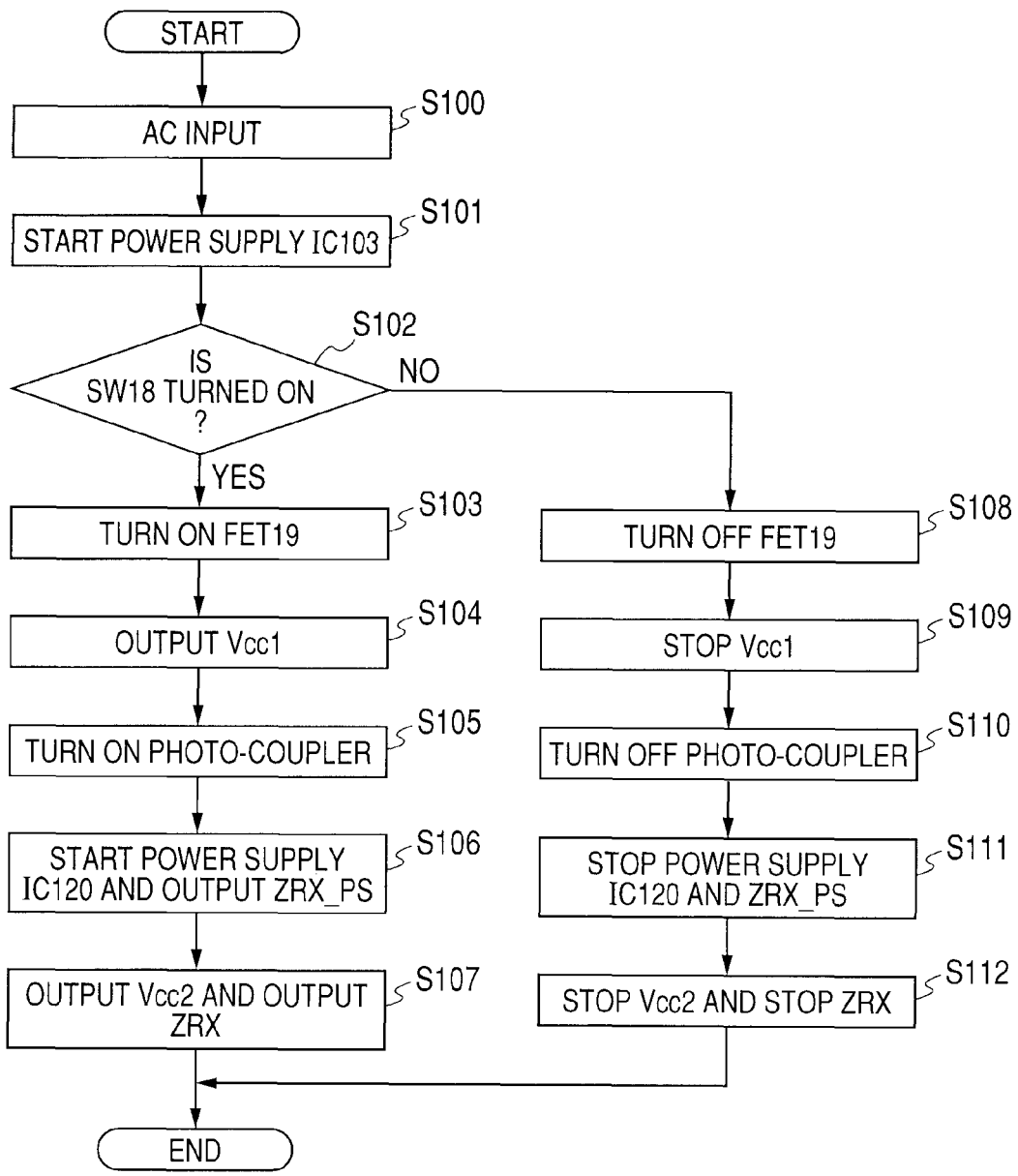
FIG. 3 is a flowchart illustrating an operational example of the power supply apparatus according to the first embodiment.

FIG. 3 is a flowchart illustrating the operation of the power supply apparatus according to the first embodiment. FIG. 3 illustrates the operation procedure of the circuit illustrated in FIG. 2, and a part of the operation procedure may be replaced with a program control of software.

First, power is input from an alternating current (AC) supply source such as a commercial power supply in Step S100, and the power supply IC 103 in the first converter 11-1 starts to start the switching operation in Step S101.

When the SW 18 is turned on by a user in Step S102, processing is advanced to Step S103, the FET 19 turns on, and Vcc1 is output in Step S104. By the output of Vcc1, the light emitting part of the photo-coupler 128 turns on in Step S105, and the transistor of the light receiving part turns on. Then, the power supply IC 120 of the second converter 12-1 starts in Step S106, and at the same time, ZRX_PS is output. Then, the ZRX signal is output from the zero crossing circuit 13-1 while Vcc2 is output in Step S107.

When the SW 18 turns off in Step S102, the FET 19 turns off in Step S108, and the output of Vcc1 stops in Step S109. Then, the photo-coupler 128 turns off in Step S110, and the power supply IC 120 stops in Step S111, and at the same time, the output of ZRX_PS stops. Then, the output of the ZRX signal stops while the output of Vcc2 stops in Step S112. Those steps S100 to S112 are repetitively executed.

<Circuit Configuration Example of Conventional Power Supply Apparatus (Comparative Configuration Example)>

Figure 4:
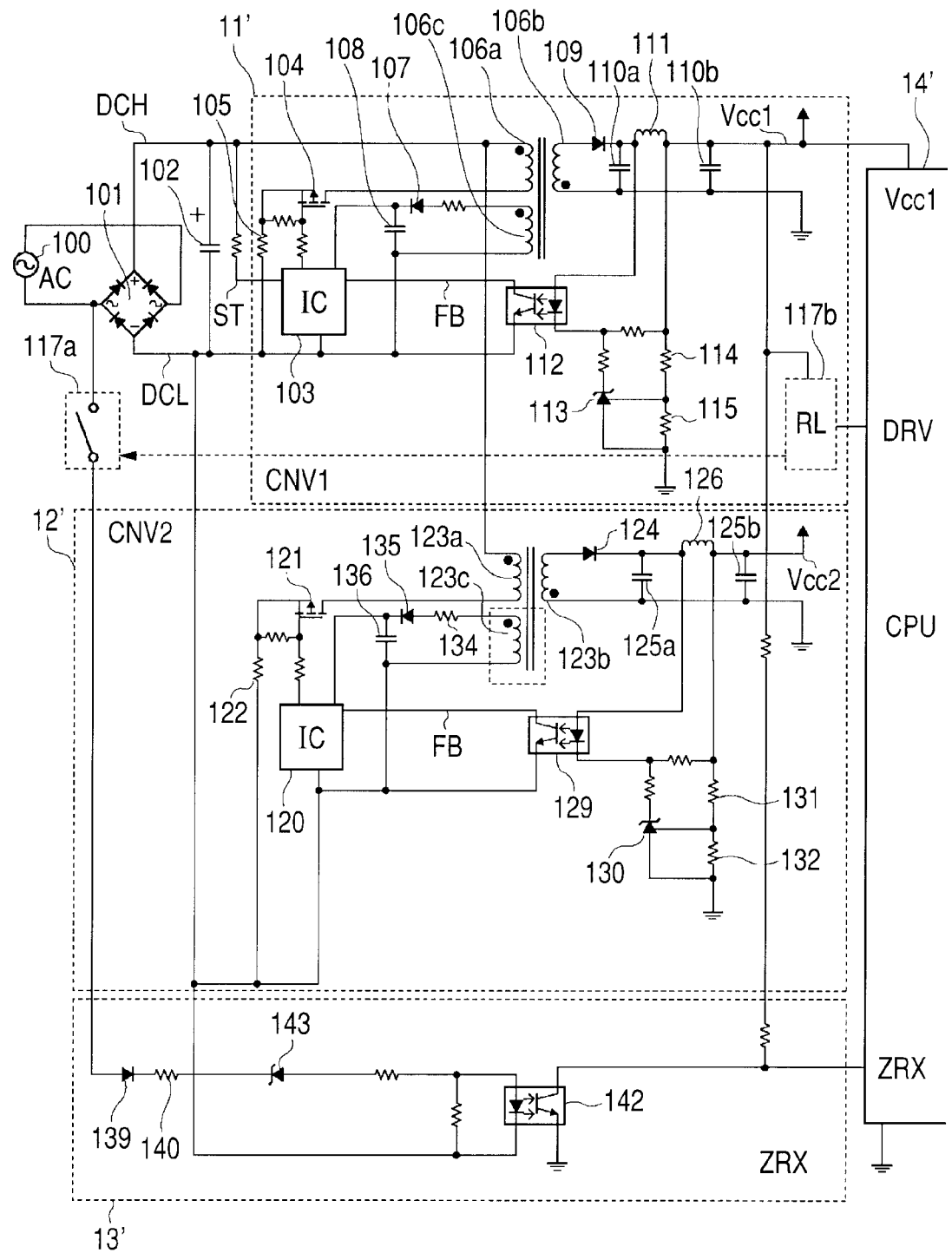
FIG. 4 is a circuit diagram illustrating a conventional power supply apparatus.

FIG. 4 is a diagram illustrating a conventional power supply apparatus for comparison with the configuration of the present invention. The same components as those of FIG. 2 are denoted by identical reference symbols.

A configuration different from the present invention is exemplified by Japanese Patent Application Laid-Open No. 2003-199336. In the conventional example, a configuration for reducing the power consumption in the zero crossing circuit includes relays 117a and 117b, and a zero crossing circuit 13'. The configuration of a first converter 11' is basically identical with the first converter 11-1.

The relays 117a and 117b are configured to interrupt an input to the zero crossing circuit 13' from the AC line in a low power consumption state by the output of the DRV signal from the CPU 14 to reduce the power consumption.

A resistor 134, a diode 135, and a capacitor 136 in a second converter 12' are configured to smooth a voltage output from a transformer auxiliary coil 123c.

In the zero crossing circuit 13', a voltage determined by subjecting the voltage of the AC line to half-wave rectification with respect to the diode 139 is applied to a Zener diode 143 through a resistor 140. The zero crossing signal ZRX is output to the CPU 14 by changing over the on/off state of the light emitting side element of the photo-coupler 142. When the voltage of the AC line is a commercial power supply of 100 V system, a peak voltage determined by executing half-wave rectification on the diode 139 is about 140 V, and the voltage needs to be decreased by the resistor 140 and a Zener diode 143 in order that the voltage is input to the light emitting side element of the photo-coupler 142. In this situation, even if the light emitting side current of the photo-coupler 142 is set to several tens milliamperes, power consumption being a product of a voltage dropped by about several 10 V to 100 V becomes several W, which is useless power consumption.

For that reason, in the conventional art, an input from the AC line is interrupted in a low power consumption state by the relays 117a and 117b to stop the power supply to the zero crossing circuit 13' as described above. In the case where the output of the zero crossing signal ZRX is unnecessary when the power state transits to the low consumption power state in the CPU 14, the DRV output is set to a low output, thereby stopping the energization of an excitation part RL in the relay 117b to interrupt an input from the AC line. When the output of the zero crossing signal ZRX is necessary, the DRV output is set to a high output, thereby energizing the excitation part RL of the relay 117b to input a voltage from the AC line to the zero crossing circuit 13'.

Further, taking a case in which plural converters are connected to each other into consideration, there may be applied a configuration in which an electric power from the switching transformer auxiliary coil 123c in the second converter 12' is consumed by the power supply IC 120. The power consumption of several watts occurs as a loss in smoothing the output from the auxiliary coil 123c by the resistor 134, the diode 135, and the capacitor 136. In the case of configuring respective transformer auxiliary coils of the plurality of converters, and a circuit for smoothing the output voltage, useless power consumption occurs in total.

As described above, in the first embodiment of the present invention as illustrated in FIGS. 2 and 3, the converter changes over between the operating state and the stop state, and at the same time, the zero crossing circuit may change over between the operating state and the stop state under the control of one system. For that reason, with a reduction in the number of auxiliary coils in the plurality of converters, the power consumption in rectifying an output from the auxiliary coils may be reduced.

Hereinafter, a second embodiment of the present invention is described with reference to the drawings.

<Circuit Configuration Example of Power Supply Apparatus in Second Embodiment>

Figure 5:
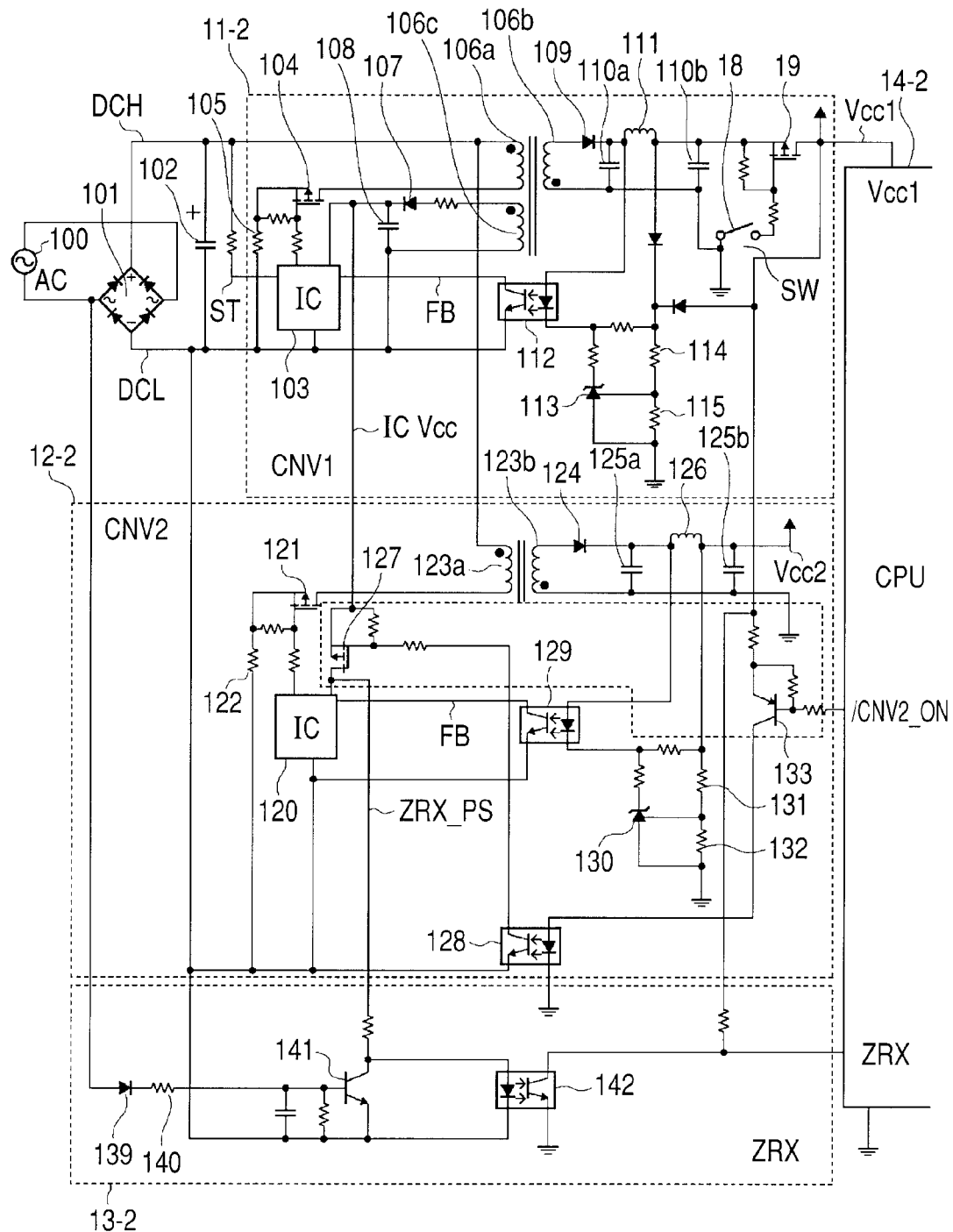
FIG. 5 is a diagram illustrating a circuit configuration example of a power supply apparatus according to a second embodiment.

FIG. 5 is a diagram illustrating a circuit configuration example of a power supply apparatus according to the second embodiment of the present invention, in which a switching element and a control signal /CNV2_ON are added to the above-mentioned configuration of FIG. 2.

In the second embodiment, the low power consumption such as a standby mode or a sleep mode in a state where the SW 18 is on is taken into consideration. In FIG. 5, the same elements as those in FIG. 2 are denoted by identical reference numerals. A first converter 11-2 and a zero crossing circuit 13-2 of FIG. 5 are basically identical with the first converter 11-1 and the zero crossing circuit 13-1 of FIG. 2.

A switching element 133 of the second converter 12-2 controls the operation of the second converter 12-2 and the power supply to the zero crossing circuit 13-2 with the aid of the signal /CNV2_ON from the CPU 14.

(Case in which Signal /CNV2_ON is Low)

When the signal /CNV2_ON is low, the switching element 133 turns on, the light emitting side element of the photo-coupler 128 is energized, and the switching element 127 turns on. Further, the zero crossing signal generation power ZRX_PS is supplied to the zero crossing circuit 13-2. Further, IC Vcc from the first converter 11-2 is supplied to the power supply IC 120 as an operation power, and the power supply IC 120 operates to output Vcc2.

A half wave of an AC voltage from the diode 139 and the resistor 140 is supplied to the transistor 141, and the transistor 141 repeats an on-state and an off-state every half wave. The light receiving side of the photo-coupler 142 repeats the on-state and the off-state, and the signal ZRX is output to the CPU 14 from the zero crossing circuit 13-2.

(Case in Which Signal /CNV2_ON is High)

When the signal /CNV2_ON is high, the switching element 133 turns off, the energization of the light emitting side element of the photo-coupler 128 stops, and the switching element 127 turns off. Further, the supply of the zero crossing signal generation power ZRX_PS to the zero crossing circuit 13-2 stops. Further, the supply of IC Vcc from the first converter 11-2 stops, the power supply IC 120 stops, and the output Vcc2 stops. Even if a half wave of the AC voltage from the diode 139 is supplied, the light receiving side of the photo-coupler 142 becomes an off-state, and the ZRX signal from the zero crossing circuit 13-2 is held in the high state.

<Operational Procedure Example of Power Supply Apparatus in Second Embodiment>

Figure 6:
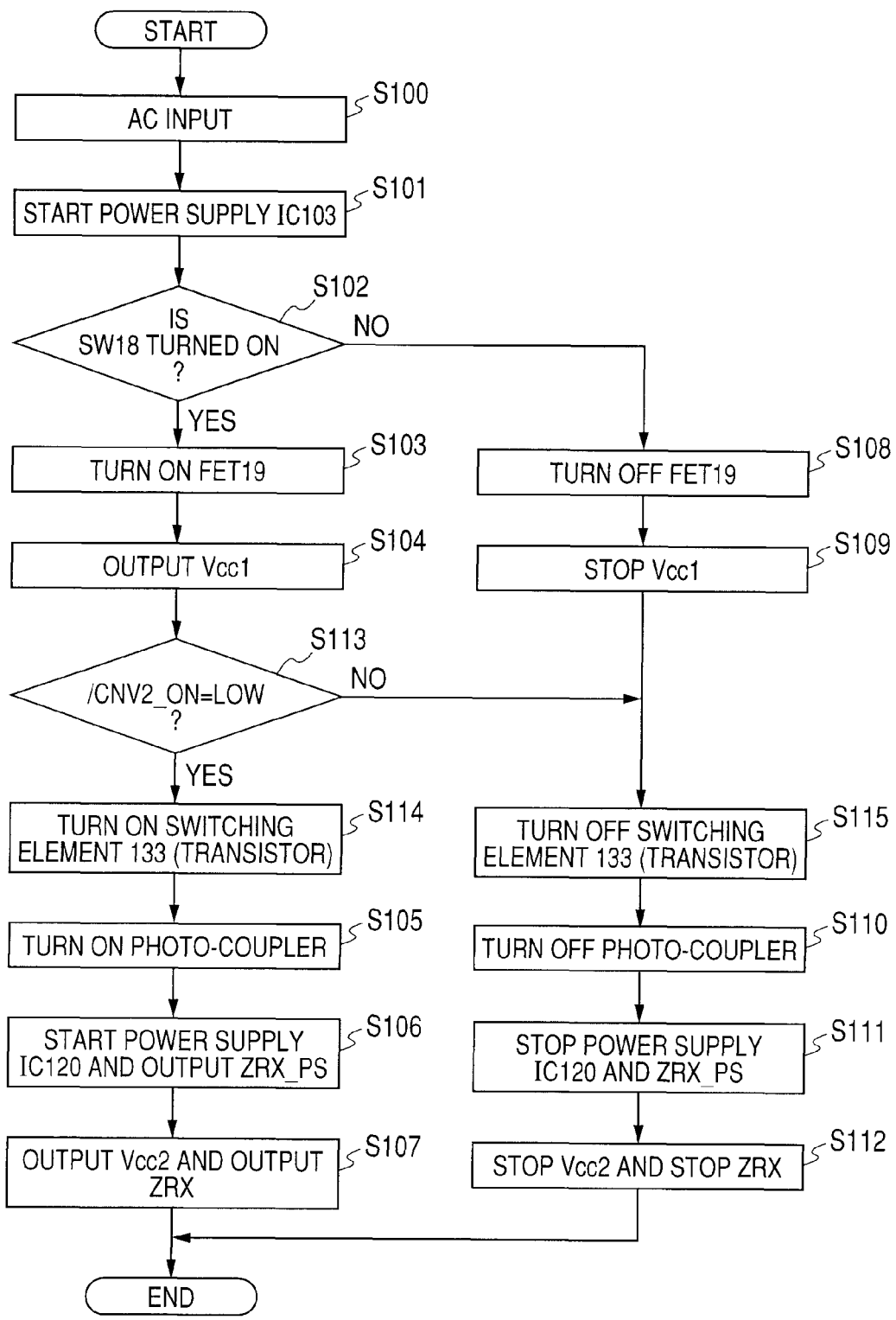
FIG. 6 is a flowchart illustrating an operational example of the power supply apparatus according to the second embodiment.

FIG. 6 is a flowchart illustrating the operation of the power supply apparatus according to the second embodiment. FIG. 6 illustrates the operation procedure of the circuit illustrated in FIG. 5, but parts of the operation procedure may be replaced with a program control of software. The same reference numeral as that in FIG. 3 indicates like processing.

Steps S100 to S112 are identical with the contents described in FIG. 3. Hereinafter, a case is described in which the CPU 14 outputs Vcc2 when the operating state of a load including the power supply apparatus is in the low power consumption state such as a standby mode or a sleep mode.

From a state where Vcc1 has been output in Step S104, the output /CNV2_ON is put into the low state by the processing within the CPU 14 in Step S113. In this case, a transistor being the switching element 133 turns on in Step S114, and the output of Vcc2 and the output of the ZRX signal start in the subsequent step.

It is assumed that the output /CNV2_ON is put into the high state by the processing within the CPU 14 in Step S113. In this case, with an aim of transition to the low power consumption state, a transistor being the switching element 133 turns off in Step S115, and the output of Vcc2 and the output of the ZRX signal stop in the subsequent step.

Those steps S100 to S115 are repetitively executed.

As described above, in the second embodiment of the present invention illustrated in FIGS. 5 and 6, the operation and stop states of the zero crossing circuit may be changed over at the same time when the operation and stop states of the second converter are changed over. For that reason, it is possible to reduce the consumption of the zero crossing signal generation power that is input to the zero crossing circuit.

Hereinafter, a third embodiment of the present invention is described with reference to the drawings.

<Circuit Configuration Example of Power Supply Apparatus in Third Embodiment>

Figure 7:
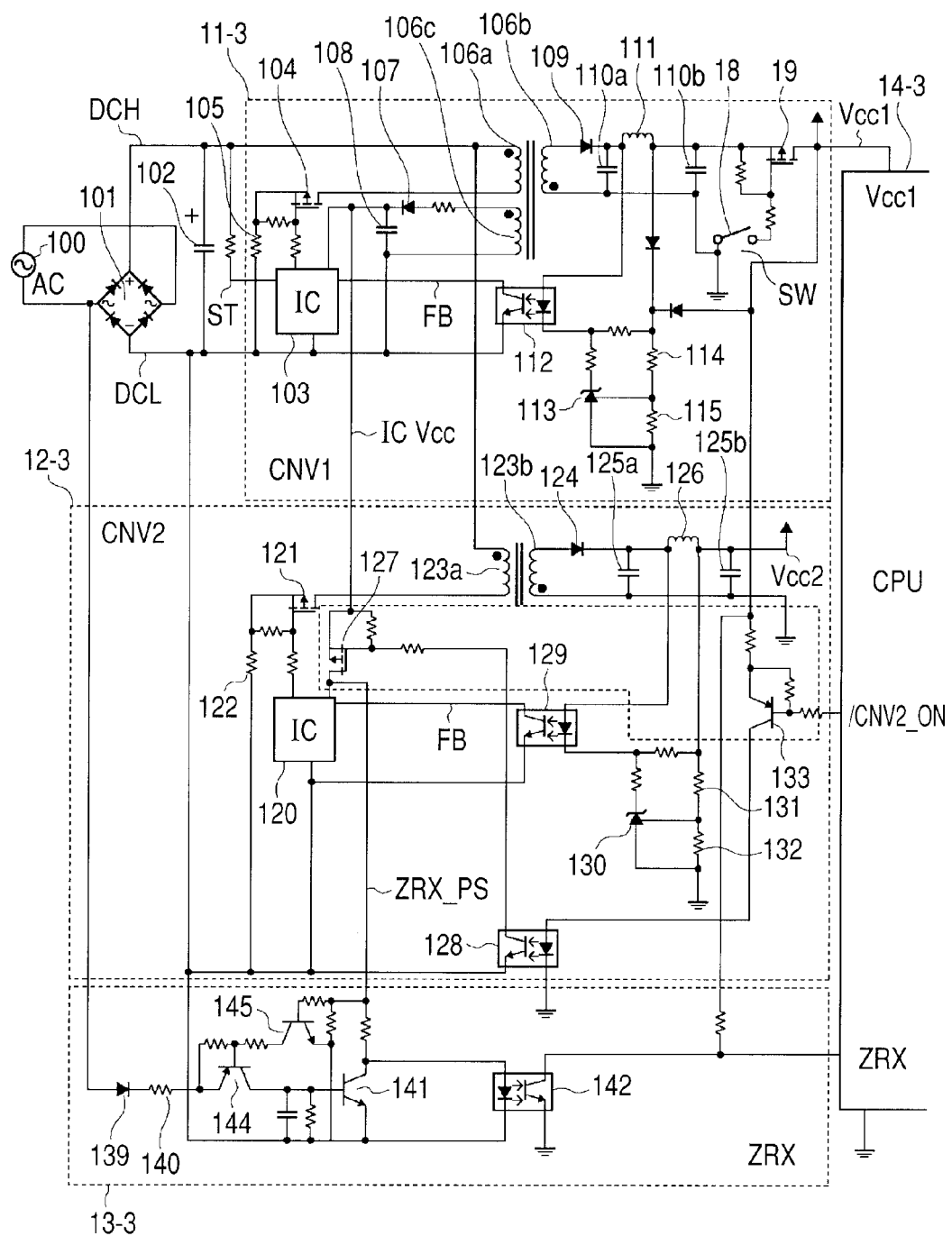
FIG. 7 is a diagram illustrating a circuit configuration example of a power supply apparatus according to a third embodiment.

FIG. 7 is a diagram illustrating a circuit configuration example of a power supply apparatus according to the third embodiment of the present invention.

Parts such as transistors 144 and 145 being switching elements and resistors are added to the configuration of the above-mentioned second embodiment illustrated in FIG. 5, for selection of the half-wave input to the transistor 141 in the zero crossing circuit 13-3. In the configuration, the operation power of the transistor 141 driven for generating the ZRX signal may be supplied or stopped, and the power consumption may be further reduced. A first converter 11-3 and a second converter 12-3 of FIG. 7 are basically identical with the first converter 11-2 and the second converter 12-2 of FIG. 5.

(Case in which Signal /CNV2_ON is Low)

When the signal /CNV2_ON is low, the switching element 133 turns on, the light emitting side element of the photo-coupler 128 is energized, and the switching element 127 turns on. Further, the zero crossing signal generation power ZRX_PS is supplied to the zero crossing circuit 13-3. Further, IC Vcc from the first converter 11-3 is supplied to the power supply IC 120 as an operation power, and the power supply IC 120 operates to output Vcc2. Further, at the same time, the transistors 144 and 145 become an on-state, a half wave of an AC voltage from the diode 139 and the resistor 140 is supplied to the transistor 141, and the transistor 141 repeats an on-state and an off-state every half wave. The light receiving side of the photo-coupler 142 repeats the on-state and the off-state, and the signal ZRX is output to the CPU 14 from the zero crossing circuit 13-3.

(Case in which Signal /CNV2_ON is High)

When the signal /CNV2_ON is high, the switching element 133 turns off, the energization of the light emitting side element of the photo-coupler 128 stops, and the switching element 127 turns off. Further, the supply of the zero crossing signal generation power ZRX_PS to the zero crossing circuit 13-3 stops. Further, the supply of IC Vcc from the first converter 11-3 stops, the power supply IC 120 stops, and the output Vcc2 stops. Further, at the same time, the transistors 144 and 145 become an off-state, and even if a half wave of the AC voltage from the diode 139 is supplied, the input of the half wave is interrupted and the transistor 141 is not driven. That is, in this state, the output of Vcc2 stops, and unnecessary operation of the switching element 141 and the transistor 144 for generating the ZRX signal stops, thereby enabling the power consumption to be reduced. Further, it is possible to reduce the power consumption generated by voltage drop caused by the diode 139 and the resistor 140. Further, because the mechanical relay 117 is not used as in the conventional art, there is no influence of the contact lifetime, and no electric power is consumed by the relay coil 117b.

<Operational Procedure Example of Power Supply Apparatus in Third Embodiment>

Figure 8:
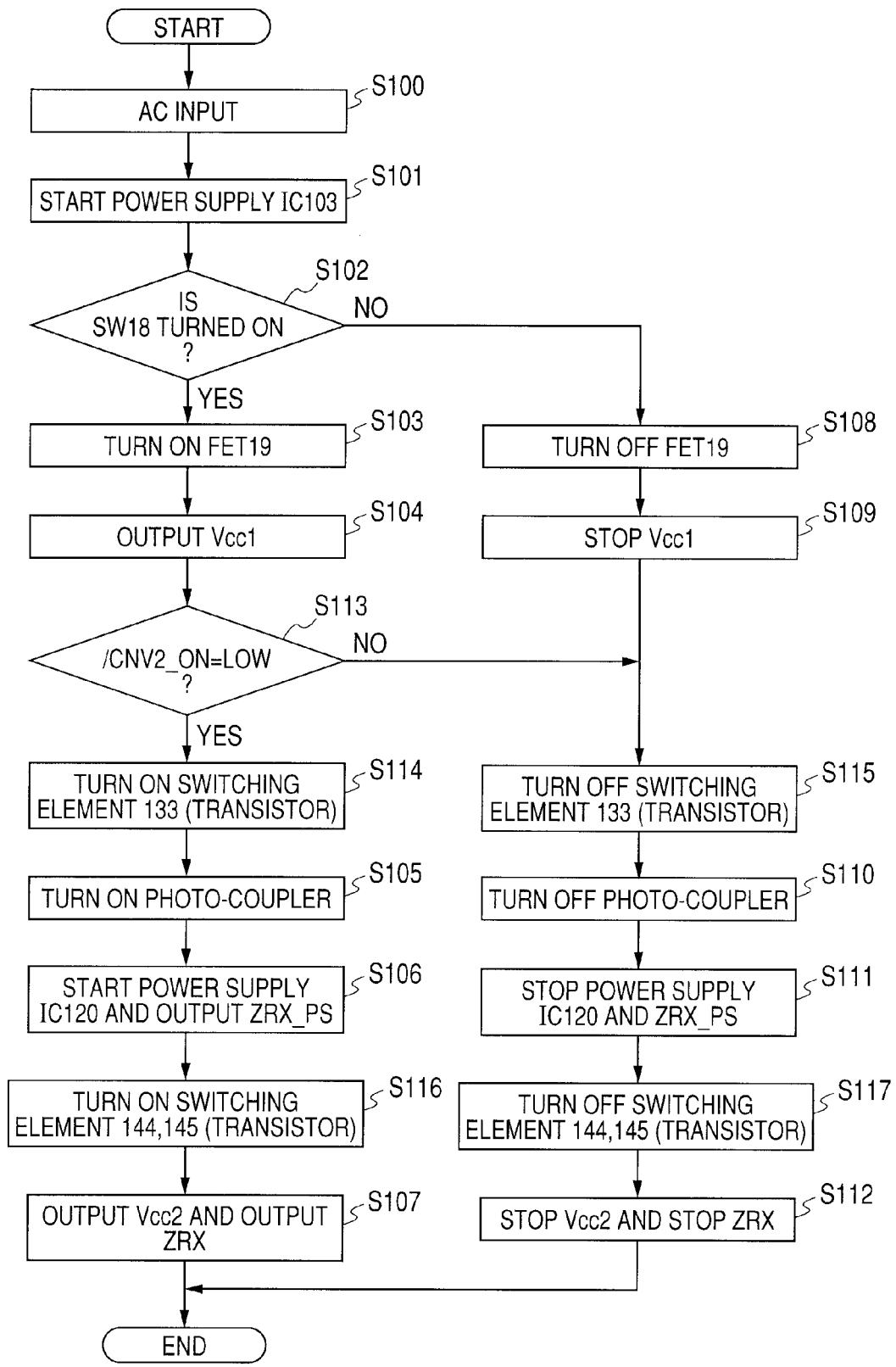
FIG. 8 is a flowchart illustrating an operational example of the power supply apparatus according to the third embodiment.

FIG. 8 is a flowchart illustrating the operation of the power supply apparatus according to the third embodiment. FIG. 8 illustrates the operation procedure of the circuit illustrated in FIG. 7, but parts of the operation procedure may be replaced with a program control of software. The same reference numeral as that in FIG. 6 indicates like processing.

Steps S100 to S115 are identical with the contents described in FIG. 6 of the above-mentioned second embodiment.

A case is described in which the CPU 14 outputs Vcc2 when the operating state of a load including the power supply apparatus is in the low power consumption state such as a standby mode or a sleep mode.

From a state where Vcc1 has been output in Step S104, the output /CNV2_ON is put into the low state by the processing within the CPU 14 in Step S113. In this case, the transistor 133 being the switching element 133 turns on in Step S114, and the photo-coupler 128 turns on in Step S105. Then, the power IC 120 starts in Step S106 to output ZRX_PS, and the transistors 144 and 145 being switching elements turn on in subsequent Step S116. After the transistors 144 and 145 turn on, the half-wave voltage from the AC line is applied to the transistor 141, and the ZRX signal is output to the CPU 14 by the operation of the photo-coupler 142.

It is assumed that the output /CNV2_ON is put into the high state by the processing within the CPU 14 in Step S113. In this case, with an aim of transition to the low power consumption state, the transistor 133 being the switching element turns off in Step S115, and the photo-coupler 128 turns off in Step S110. Then, the power supply IC 120 stops in Step S111, the output of ZRX_PS stops, and the transistors 144 and 145 being switching elements turn off in subsequent Step S117. Then, the output of Vcc2 and the output of the ZRX signal stop in the subsequent step. When the transistors 144 and 145 turn off, no half-wave voltage from the AC line is applied to the transistor 141. For that reason, the power consumption may be reduced in the lower power consumption state such as a standby mode or a sleep mode which requires no output of the ZRX signal by stopping the operation of the photo-coupler 142.

Those steps S100 to S117 are repetitively executed.

As described above, the supply of the half-wave voltage may be changed over at the same time when the operation and stop states of the zero crossing circuit are changed over. For that reason, it is possible to reduce the power consumption in dropping the half-wave voltage that is input to the zero crossing circuit.

Hereinafter, a fourth embodiment of the present invention is described with reference to the drawings.

<Circuit Configuration Example of Power Supply Apparatus in Fourth Embodiment>

Figure 9:
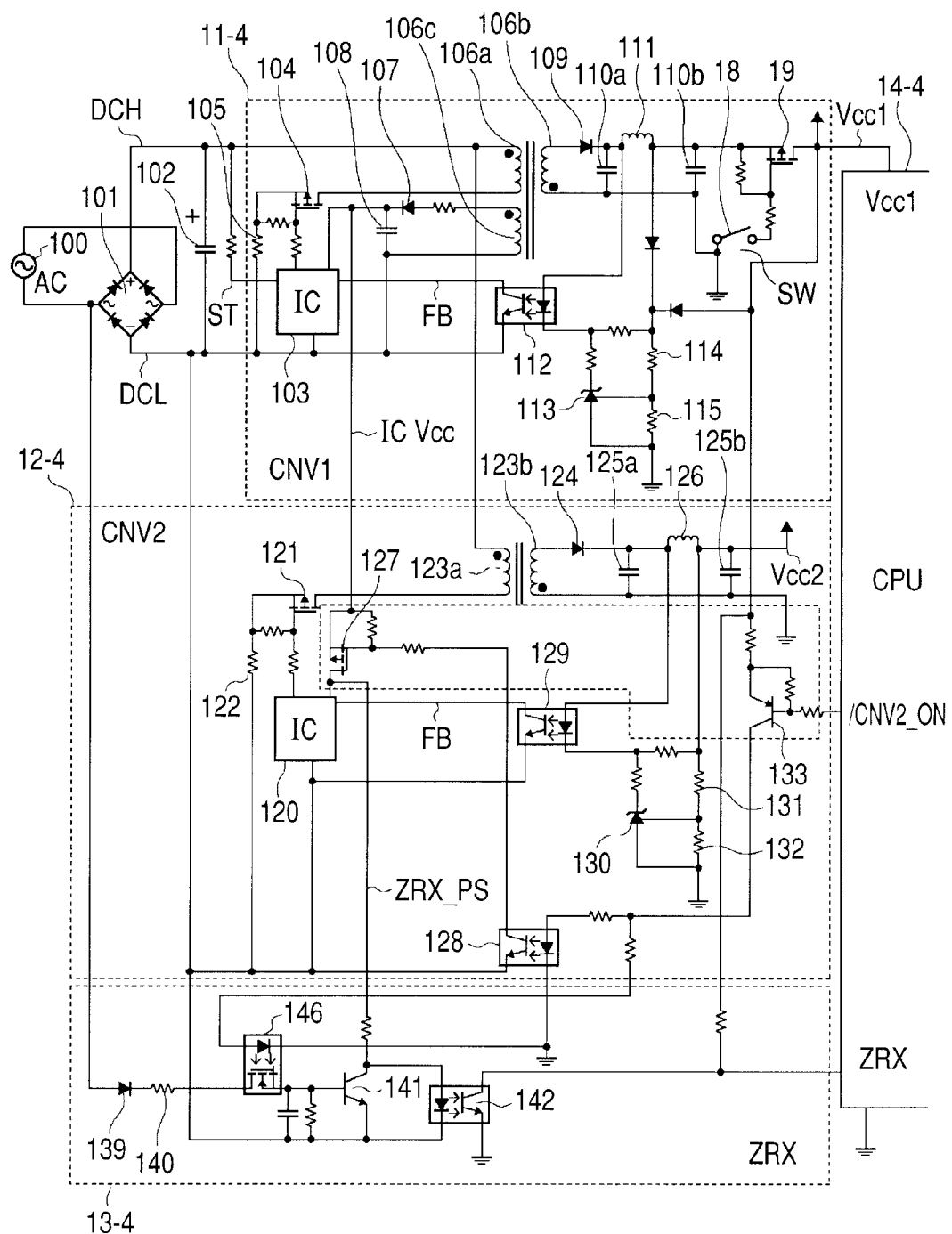
FIG. 9 is a diagram illustrating a circuit configuration example of a power supply apparatus according to a fourth embodiment.

FIG. 9 is a diagram illustrating a circuit configuration example of a power supply apparatus according to the fourth embodiment of the present invention.

In the configuration of the above-mentioned third embodiment illustrated in FIG. 7, parts such as the transistors 144 and 145 being switching elements, and resistors are replaced with a photo relay 146 and a resistor. The operation power of the transistor 141 driven for generating the ZRX signal may be supplied or stopped. Accordingly, there is no need to additionally provide the DRV output being a control terminal from the CPU 14 as in the above-mentioned conventional art, and the power consumption of the zero crossing circuit 13 may be reduced by using the output /CNV2_ON. A first converter 11-4 and a zero crossing circuit 13-4 of FIG. 9 are basically identical with the first converter 11-3 and the zero crossing circuit 13-3 of FIG. 7.

(Case in which Signal /CNV2_ON is Low)

When the signal /CNV2_ON is low, the switching element 133 turns on, the light emitting side element of the photo-coupler 128 is energized, and the switching element 127 turns on. Further, the zero crossing signal generation power ZRX_PS is supplied to the zero crossing circuit 13-4. Further, IC Vcc from the first converter 11-4 is supplied to the power supply IC 120 as an operation power, and the power supply IC 120 operates to output Vcc2. Further, at the same time, because the switching element 133 is on, Vcc1 is supplied to the photo relay 146, and the photo relay 146 turns on. Then, a half wave of an AC voltage from the diode 139 and the resistor 140 is supplied to the transistor 141, and the transistor 141 repeats an on-state and an off-state every half wave. The light receiving side of the photo-coupler 142 repeats the on-state and the off-state, and the signal ZRX is output to the CPU 14 from the zero crossing circuit 13-4.

(Case in which Signal /CNV2_ON is High)

When the signal /CNV2_ON is high, the switching element 133 turns off, the energization of the light emitting side element of the photo-coupler 128 stops, and the switching element 127 turns off. Further, the supply of the zero crossing signal generation power ZRX_PS to the zero crossing circuit 13-4 stops. Further, the supply of IC Vcc from the first converter 11-4 stops, the power supply IC 120 stops, and the output Vcc2 stops. Further, at the same time, the supply of Vcc1 stops to put the photo relay 146 into the off state, and the transistor 141 is not driven even if the half wave of the AC voltage from the diode 139 is supplied thereto.

That is, in this state, the output of Vcc2 stops, and unnecessary operation of the transistor 141 being the switching element for generating the ZRX signal stops, thereby enabling the power consumption to be reduced. Further, it is possible to reduce the power consumption generated by voltage drop caused by the diode 139 and the resistor 140. Further, the use of the switching element such as the photo relay 146 enables the deterioration to be reduced as compared with the relay having a mechanical contact as in the conventional art illustrated in FIG. 4, and the long lifetime may be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-020738, filed Jan. 30, 2009, which is hereby incorporated by reference herein in its entirety.

What is claimed is:

1. A power supply apparatus comprising:
a first converter including a first transformer and a first control unit, the first transformer having a primary winding and an auxiliary winding on a primary side and an output winding on a secondary side, for applying a rectified voltage rectified from an alternating voltage into the primary winding, the first control unit controlling a switching operation of a switching element connected to the first transformer to apply a pulse voltage into the primary winding of the first transformer, wherein the first converter outputs a first voltage from the output winding of the first transformer;
a second converter including a second transformer, and a second control unit to which an induced voltage induced in the auxiliary winding of the first transformer is applied, the second transformer having a primary winding on a primary side and an output winding on a secondary side, wherein the rectified voltage is applied into the primary winding of the second converter, the second control unit controlling a switching operation of a switching element connected to the second transformer to apply a pulse voltage into the primary winding of the second transformer, wherein the second converter outputs a second voltage from the output winding of the second transformer;
a zero crossing signal output unit to which the induced voltage induced in the auxiliary winding of the first transformer is applied, wherein the zero crossing signal output unit outputs a zero crossing signal according to a zero crossing timing; and
a switch part that stops supplying the induced voltage induced in the auxiliary winding of the first transformer to the second control unit and the zero crossing signal output unit, according to a supply of the first voltage to a load being stopped.

2. A power supply apparatus according to claim 1, further comprising:
a voltage input part that rectifies the voltage to be input to said first and second converters and inputs the rectified voltage to said zero crossing signal output unit; and
a voltage input selection part that selectively inputs a voltage from said voltage input part to said zero crossing signal output unit according to a switching operation of said switch part,
wherein the voltage input selection part inputs no voltage to said zero crossing signal output unit from the voltage input part while the supply of the DC voltage to the second control part and the zero crossing signal output unit stops.

3. A power supply apparatus according to claim 1, further comprising a voltage stop part that stops the supply of the DC voltage to the second control part and the zero crossing signal output unit at the same timing.

4. A power supply apparatus according to claim 1, wherein the switch part further stops the supply of the DC voltage to a switch part of said zero crossing signal output unit while the supply of the DC voltage to the second control part and the zero crossing signal output unit stops.

5. An image forming apparatus comprising
a power supply apparatus according to claim 1;
a fixing apparatus to which that an AC voltage input to said power supply apparatus is applied; and
a driving part to which a voltage from the first converter or the second converter is applied.

6. An image forming apparatus comprising:
an image forming part;
a driving part that drives the image forming part;
a control part that controls the image forming part;
a first converter that supplies a DC voltage to the control part, wherein the first converter includes a first transformer and a first control unit, the first transformer having a primary winding and an auxiliary winding on a primary side and an output winding on a secondary side, for applying a rectified voltage rectified from an alternating voltage into the primary winding, the first control unit controlling a switching operation of a switching element connected to the first transformer to apply a pulse voltage into the primary winding of the first transformer, wherein the first converter outputs a first voltage from the output winding of the first transformer;
a second converter that supplies a DC voltage to the driving part, wherein the second converter includes a second transformer, and a second control unit to which an induced voltage induced in the auxiliary winding of the first transformer is applied, the second transformer having a primary winding on a primary side and an output winding on a secondary side, wherein the rectified voltage is applied into the primary winding of the second converter, the second control unit controlling a switching operation of a switching element connected to the second transformer to apply a pulse voltage into the primary winding of the second transformer, wherein the second converter outputs a second voltage from the output winding of the second transformer;

a zero crossing signal output unit to which the induced voltage induced in the auxiliary winding of the first transformer is applied, wherein the zero crossing signal output unit outputs a zero cross signal according to a zero crossing timing; and a switch part that stops supplying the induced voltage induced in the auxiliary winding of the first transformer to the second control unit and the zero crossing signal output unit, according to a supply of the first voltage to a load being stopped.

7. The image forming apparatus according to claim 6, further comprising:

a voltage input part that rectifies the voltage to be input to said first and second converters and inputs the rectified voltage to said zero crossing signal output unit; and a voltage input selection part that selectively inputs a voltage from said voltage input part to said zero crossing signal output unit according to a switching operation of said switch part, wherein the voltage input selection part inputs no voltage to said zero crossing signal output unit from the voltage input part while the supply of the DC voltage to the second control part and the zero crossing signal output unit stops.

8. The image forming apparatus according to claim 6, further comprising a voltage stop part that stops the supply of the DC voltage to the second control part and the zero crossing signal output unit at the same timing.

9. The image forming apparatus according to claim 6, wherein the switch part further stops the supply of the DC voltage to a switch part of said zero crossing signal output unit while the supply of the DC voltage to the second control part and the zero crossing signal output unit stops.

10. The image forming apparatus according to claim 6, wherein the image forming part includes a fixing part that fixes an image formed on a recording material onto a recording material, and wherein the fixing part operates according to the zero cross signal.

* * * * *